(No Model.)
J. S. CUSSON.
SWEAT PAD.
No. 413,648. Patented Oct. 29, 1889.
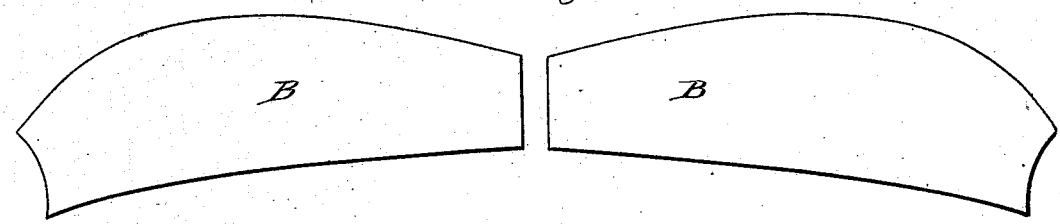
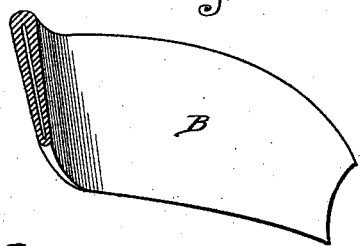
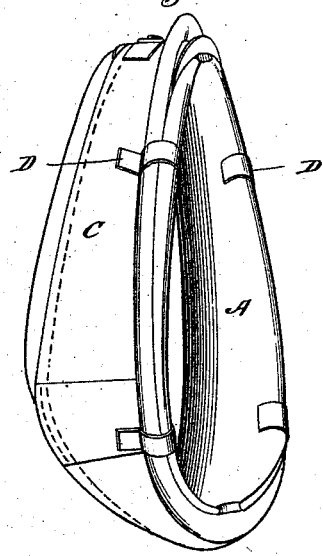

UNITED STATES PATENT OFFICE.

JAPHET S. CUSSON, OF DE KALB, ILLINOIS, ASSIGNOR OF TWO-THIRDS TO JOSEPH F. GLIDDEN AND CHASE E. GLIDDEN, OF SAME PLACE.

SWEAT-PAD.

SPECIFICATION forming part of Letters Patent No. 413,648, dated October 29, 1889.

Application filed March 12, 1888. Serial No. 266,979. (No model.)

*To all whom it may concern:*

Be it known that I, JAPHET S. CUSSON, a citizen of the United States, residing in the city of De Kalb, in the county of De Kalb and State of Illinois, have invented a new and useful Sweat-Pad; and I do hereby declare that the following is a full, clear, and exact description thereof, reference being had to the accompanying drawings, and to the letters of reference marked thereon, which form part of this specification.

Figure 1 represents a plan view of my felt sweat-pad; Fig. 2, a sectional view of such pad of double thickness; Fig. 3, the clasp-connection between such pad and its associate collar.

In the accompanying drawings, A represents the sweat-pad; B, one half or lobe of my sweat-pad, composed of two thicknesses of felt, exhibiting the gradation in size of the pad, one part broken away; and C, the collar, in position in relation to the pad, showing the clasp D, uniting or locking the collar and pad, as desired.

My invention relates to an improved sweat-pad and to certain peculiarities of construction of the same.

Heretofore sweat-pads have been made of various substances and materials having more or less hardness of texture and rigidity.

My invention consists of forming the entire pad, as to all of its parts, of felt, as hereinafter described, but particularly pointed out in the claims. The felt itself furnishes a sufficient protection and cushion between the collar and the shoulder of the animal in draft, and, being porous and yielding upon pressure, does not chafe, abrade, or heat the animal at its point of contact, furnishing sufficient ventilation by reason of the porosity of the pad itself, and being in every way more desirable than any pad heretofore manufactured for use, besides being very cheap and easy of manufacture.

Other important elements of my invention are a certain shape given to the pad itself, such pad being much thicker at its outer than at its inner edge, so as to more readily adapt itself to the pressure to be placed upon it and to the movement of the shoulders or body of the horse in connection therewith, such outer thickness being preferably three times that of the thickness at the inner edge.

Another element of this invention is the formation of the pad with a double thickness, so that the two parts to some extent are capable of movement upon each other, and in this manner permit a more ready and advantageous adjustment when in use, and thereby my pad is distinguishable from saddle-cloths and like articles formed with pockets having a filling or stuffing of hair or like material.

A further element is the attachment of this pad and its securement to the associate collar.

The advantages of such pad are many and other aside from those above expressed, consisting chiefly in the fact that any portion of the pad can be cut away and removed at any point and in any shape desired to relieve pressure in case of soreness or injury to the animal at the point of pressure, and can be readily replaced when the necessity has passed, and thus restore the continuity of the pad as an entirety.

Another important element of my invention resides in the fact that the two lobes or divisions of my sweat-pad can be reversed when the part of the pad coming in contact with the shoulders of the horse becomes worn and soiled. The reversing of such pad places the clean and unused side of the pad in contact with the animal and the reversed side in contact with the collar, and in this manner doubles the life of the pad, the hooks or clasps here present permitting and insuring this reversement and arrangement.

Having thus fully described my invention, what I claim as new, and desire to secure by Letters Patent, is—

1. A sweat-pad for horse-collars, composed of a felted fabric in flattened tubular form, whereby the parts have direct contact and are adapted to move upon each other, substantially as described.

2. A sweat-pad for horse-collars, formed of two lobes, each composed of a flattened seamless tubular body of felt thicker at one edge than at the other, substantially as described.

3. The combination of the sweat-pad herein described, made of felt and in flattened tubular form, with a horse-collar and means, substantially as described, for securing the pad to the collar.

JAPHET S. CUSSON.

Witnesses:
 FREDERICK C. GOODWIN,
 R. S. WEBSTER.